United States Patent
Nguyen et al.

(10) Patent No.: US 11,889,392 B2
(45) Date of Patent: Jan. 30, 2024

(54) AIRCRAFT NETWORK CYBERSECURITY APPARATUS AND METHODS

(71) Applicant: The Boeing Company, Chicago, IL (US)

(72) Inventors: Daniel Nguyen, Auburn, WA (US); Michael Vanguardia, Kent, WA (US); Adonis Williams, Renton, WA (US)

(73) Assignee: The Boeing Company, Arlington, VA (US)

( * ) Notice: Subject to any disclaimer, the term of this patent is extended or adjusted under 35 U.S.C. 154(b) by 925 days.

(21) Appl. No.: 16/442,389

(22) Filed: Jun. 14, 2019

(65) Prior Publication Data
US 2020/0396250 A1 Dec. 17, 2020

(51) Int. Cl.
| | |
|---|---|
| *H04W 4/42* | (2018.01) |
| *B64D 11/00* | (2006.01) |
| *B64D 45/00* | (2006.01) |
| *H04L 41/0226* | (2022.01) |
| *H04L 41/12* | (2022.01) |
| *H04L 9/40* | (2022.01) |

(52) U.S. Cl.
CPC ........... *H04W 4/42* (2018.02); *B64D 11/0015* (2013.01); *B64D 45/00* (2013.01); *H04L 41/0226* (2013.01); *H04L 41/12* (2013.01); *H04L 63/1408* (2013.01); *H04L 63/1475* (2013.01)

(58) Field of Classification Search
CPC . B64D 11/0015; B64D 45/00; H04L 41/0226; H04L 41/12; H04W 4/42
See application file for complete search history.

(56) References Cited

U.S. PATENT DOCUMENTS

| | | | |
|---|---|---|---|
| 6,363,489 B1 | 3/2002 | Comay et al. | |
| 7,409,716 B2 | 8/2008 | Barnett et al. | |
| 9,938,019 B2 | 4/2018 | Floyd et al. | |
| 2003/0027550 A1 | 2/2003 | Rockwell | |
| 2007/0150954 A1 | 6/2007 | Shon | |
| 2008/0181169 A1 | 7/2008 | Lauer et al. | |
| 2009/0010200 A1 | 1/2009 | Lauer et al. | |
| 2009/0129301 A1 | 5/2009 | Belimpasakis | |
| 2012/0030717 A1* | 2/2012 | Buga ................. | H04B 7/18506 725/76 |
| 2013/0232565 A1* | 9/2013 | O'Connor ............. | H04L 63/107 726/13 |
| 2013/0305357 A1 | 11/2013 | Ayyagari et al. | |

(Continued)

OTHER PUBLICATIONS

Harnett et al., FAA Security, State of the State and Beyond, Airborne Network Cyber Security Issues for E-Enabled Aircraft Certification and Operations, Presented to 2008 National Software and Airborne Electronic Hardware Standardization Conference, Aug. 20, 2008, U.S. Department of Transportation, Research and Innovative Technology Administration, 53 pages.

(Continued)

*Primary Examiner* — Jackie Zuniga Abad
(74) *Attorney, Agent, or Firm* — Kolisch Hartwell, P.C.

(57) ABSTRACT

Mapping of an avionic network is obfuscated by interposing a network module between an external-access node and a bus of an avionics network. First and second network maps are generated and loaded on the network module. The network map accessible to the external-access node is changed from the first network map to the second network map, to disrupt any reconnaissance of the avionics network.

20 Claims, 7 Drawing Sheets

(56) References Cited

U.S. PATENT DOCUMENTS

2017/0300852 A1\* 10/2017 Glatfelter ......... G06Q 10/06312
2018/0232250 A1\* 8/2018 Stephens ................. H04L 67/10
2019/0036882 A1\* 1/2019 Ding ................... H04L 61/2557

OTHER PUBLICATIONS

European Patent Office, Extended European Search Report regarding European Patent Application No. 20175380.3, dated Oct. 26, 2020, 6 pages.
Canadian Intellectual Property Office, Office Action regarding Canadian Patent Application No. 3,080,980, dated Jun. 8, 2023, 4 pages.

\* cited by examiner

AIRCRAFT NETWORK CYBERSECURITY APPARATUS AND METHODS

FIELD

This disclosure relates to systems and methods for network security. More specifically, the disclosed examples relate to disrupting a reconnaissance phase of a cyberattack.

INTRODUCTION

There is a growing demand for network connectivity (e.g., Internet access) for passengers on aircraft and other vehicles. As passenger connectivity increases, it is increasingly important that network security systems be capable of deterring malicious network activity. For example, there is a need for improved systems and methods for deterring reconnaissance via external access points provided for passengers.

SUMMARY

The present disclosure provides systems, apparatuses, and methods related to obfuscating mapping of a computer network. In some examples, a method of obfuscating mapping of an avionic network may include operatively coupling a network module between an external-access node and an avionics bus of the avionic network, with all communications between the external-access node and the avionics bus passing through the network module. The method may further include generating a first network map identifying network addresses for a first set of components on at least a first portion of the avionics bus, loading the first network map on the network module, and making the first network map accessible to the external access node. The method may further include generating at least a second network map identifying network addresses for a second set of components on at least a second portion of the avionic network, the second network map being different from the first network map, and loading the second network map on the network module. The method may further include changing the network map accessible to the external-access node from the first network map to the second network map.

In some examples, a network module may be operatively coupled to an avionic network and configured to be operatively interposed between an avionics bus of the avionic network and an external-access node, with all communications between the external-access node and the avionics bus passing through the network module. The module may be configured to generation a first network map identifying network addresses for a first set of components on at least a first portion of the avionic network and make the first network map accessible to the external-access node. The module may be configured to generate a second network map identifying network addresses for a second set of components on at least a second portion of the avionic network, the second network map being different from the first network map. The module may be configured to change the network map accessible to the external-access node from the first network map to the second network map.

In some examples, a system for obfuscating network mapping of an avionic network of an aircraft may include a first container including a first network map identifying network addresses for network components of at least a first portion of the avionic network, and a second container including a second network map identifying network addresses for network components of at least a second portion of the avionic network, the second network map being different form the first network map. The system may further include a switching device configured to interpose the first container between an avionics bus of the avionic network and an external-access node, and in response to at least a first criterion, replace the first container with the second container interposed between the avionics bus and the external access node for changing the network map accessible to the external-access node from the first network map to the second network map.

Features, functions, and advantages may be achieved independently in various examples of the present disclosure, or may be combined in yet other examples, further details of which can be seen with reference to the following description and drawings.

DETAILED DESCRIPTION

Figure 2:
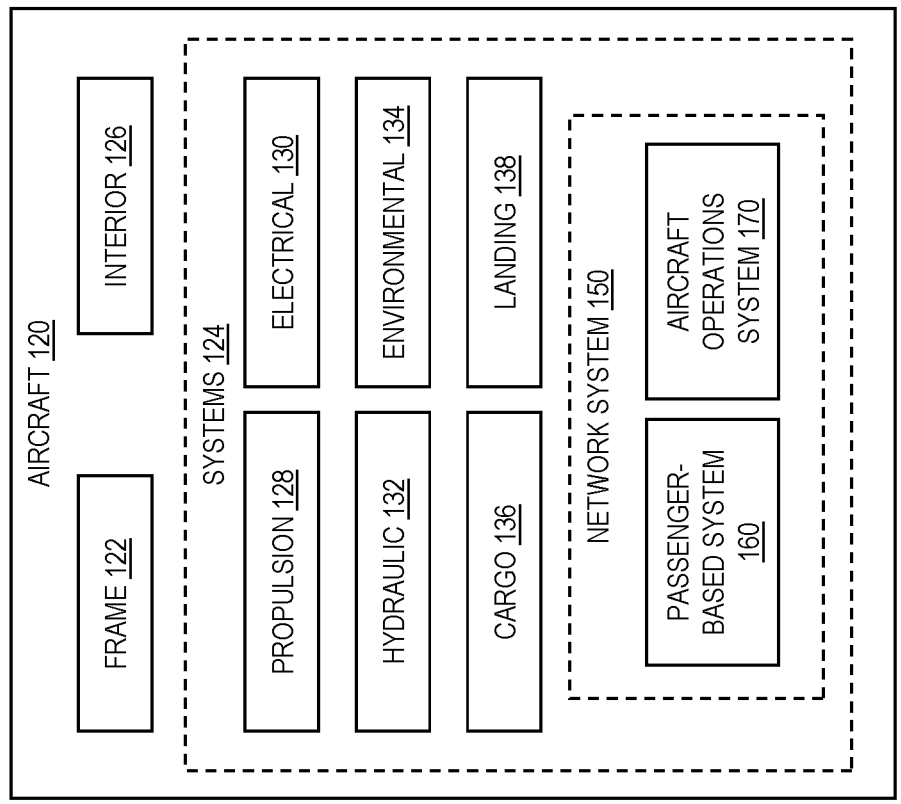
FIG. 2 is a schematic diagram of an illustrative aircraft.

Various aspects and examples of a method of obfuscating mapping of a computer network, as well as related apparatus, are described below and illustrated in the associated drawings. Unless otherwise specified, a network module in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through E, each of which is labeled accordingly.

Overview

In general, a method of obfuscating the mapping of a computer network includes operatively interposing a network module between an external-access point and a remainder of the computer network. The network may be associated with a passenger vehicle having a network accessible by passengers using a suitable data processing system, such as may be included on an aircraft, ship or other watercraft, train, subway train, bus, car, and/or truck. For example, the vehicle may be an aircraft having a network system configured to allow passengers to access the network using their personal devices (also called passenger devices). Passengers can use passenger devices connected to the vehicle network to communicate with, e.g., an in-flight entertainment system, an external network such as the Internet, and/or any other suitable system accessible via the vehicle network.

Vehicle network access may increase passengers' convenience and/or enjoyment. However, there exists a possibility that a passenger could use a device connected to the vehicle network to attempt to access a portion of the vehicle network system that is off-limits to passengers. For example, a passenger could connect their device to a passenger-based portion of the vehicle network via a network-access device provided for passenger use, and then attempt to communicate with a restricted network system that passengers are not authorized to access.

Unauthorized intrusion into restricted systems on the vehicle network by a passenger or other actor may typically begin with a reconnaissance phase including activities such as determining a network mapping, port scanning, and/or gathering of other network information. Most network security is static, allowing an accurate assessment of the defenses. The network module is configured to disrupt this reconnaissance phase by masking and altering the network mapping accessible to the passenger, thereby forestalling intrusion or attack.

The network module is configured to act as an interface such as a gateway or proxy between the external-access point and the remainder of the vehicle network, and present an artificial network mapping to all devices connected to the external-access point. The network module is further configured to change the presented artificial network mapping according to a preselected criterion or criteria. For example, the network module can change the presented artificial network mapping at regular time intervals, at random time intervals, at selected geographic locations of the vehicle, in response to selected network conditions or monitored network activity, and/or any desired criteria.

The criteria can be selected by a user of the network module, such as an administrator of the vehicle network. The criteria can be selected as part of other network operations, such as when the network module is installed, during regular network maintenance, and/or as part of a change to security on the network. The criteria can additionally or alternatively be selected as part of other vehicle operations, such as the preflight checklist of an aircraft, when a train is assigned to a new route, or during regular vehicle maintenance. The criteria can additionally or alternatively be selected in response to security information or concerns such as the appearance of a new network penetration technique, an increase in network penetration attempts by vehicle passengers, and/or the addition of a highly sensitive system to the vehicle network.

Technical solutions are disclosed herein for deterring unauthorized access to restricted systems of a computer network. Specifically, the disclosed system/method addresses a technical problem tied to computer technology and arising in the realm of computer networks, namely the technical problem of preventing an unauthorized user from compiling an accurate network mapping. The system and method disclosed herein solves this technical problem by masking the actual static network mapping and presenting an artificial dynamic network mapping to users of a network access device. Accordingly, the disclosed systems and methods do not merely recite the performance of some known practice along with the requirement to perform it on a computer. Rather they provide a solution necessarily rooted in computer technology to overcome a problem specifically arising in the realm of networks.

Aspects of a method of network mapping obfuscation and/or an obfuscating module may be embodied as a computer method, computer system, or computer program product. Accordingly, aspects of the obfuscation method or module may take the form of an entirely hardware example, an entirely software example (including firmware, resident software, micro-code, and the like), or an example combining software and hardware aspects, all of which may generally be referred to herein as a "circuit," "module," or "system." Furthermore, aspects of the obfuscation method or module may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the network mapping obfuscation method or module may be written in one or any combination of programming languages, including an object-oriented programming language such as Java, Smalltalk, C++, and/or the like, and conventional procedural programming languages, such as C. Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of network mapping obfuscation methods and modules are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the network mapping obfuscation method or module. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of exemplary methods of obfuscating mapping of computer networks as well as related systems and/or apparatus. The examples in these sections are intended for illustration and should not be interpreted as limiting the entire scope of the present disclosure. Each section may include one or more distinct examples, and/or contextual or related information, function, and/or structure.

A. Illustrative Aircraft and Associated Method

Figure 1:
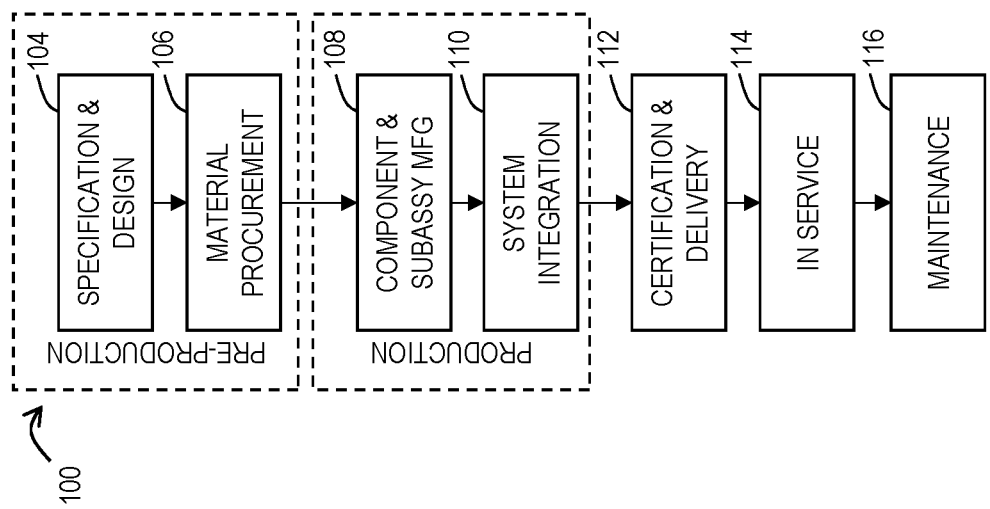
FIG. 1 is a flowchart depicting steps of an illustrative aircraft manufacturing and service method.

Examples disclosed herein may be described in the context of an illustrative aircraft manufacturing and service method 100 (see FIG. 1) and an illustrative aircraft 120 (see FIG. 2). Method 100 includes a plurality of processes, stages, or phases. During pre-production, method 100 can include a specification and design phase 104 of aircraft 120 and a material procurement phase 106. During production, a component and subassembly manufacturing phase 108 and a system integration phase 110 of aircraft 120 can take place. Thereafter, aircraft 120 can go through a certification and delivery phase 112 to be placed into in-service phase 114. While in service (e.g., by an operator), aircraft 120 can be scheduled for routine maintenance and service 116 (which can also include modification, reconfiguration, refurbishment, and so on of one or more systems of aircraft 120). While the examples described herein relate generally to operational use during in-service phase 114 of aircraft 120, they can be practiced at other stages of method 100.

Each of the processes of method 100 can be performed or carried out by a system integrator, a third party, and/or an operator (e.g., a customer). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

Illustrative method 100 can be used to produce an aircraft 120. Aircraft 120 is an example of a vehicle having a vehicle network as described above. As shown in FIG. 2, aircraft 120 can include a frame 122 with a plurality of systems 124 and an interior 126. Examples of plurality of systems 124 include one or more of a propulsion system 128, an electrical system 130, a hydraulic system 132, an environmental system 134, a cargo system 136, a landing system 138, and a vehicle network system 150. Vehicle network system 150 can include, e.g., a passenger-based system 160 that passengers can be authorized to access, and an aircraft operations system 170 that passengers are typically not authorized to access.

Each of the plurality of systems 124 can comprise various subsystems, such as controllers, processors, actuators, effectors, motors, generators, etc., depending on the functionality involved. Any number of other systems can be included. Although an aerospace example is shown, the principles disclosed herein can be applied to other industries, such as the automotive industry, rail transport industry, and nautical transport industry. Accordingly, in addition to aircraft 120, the principles disclosed herein can apply to other vehicles, e.g., land vehicles, marine vehicles, etc. Apparatuses and methods shown or described herein can be employed during any one or more of the stages of the manufacturing and service method 100.

B. Illustrative Data Processing System

Figure 3:
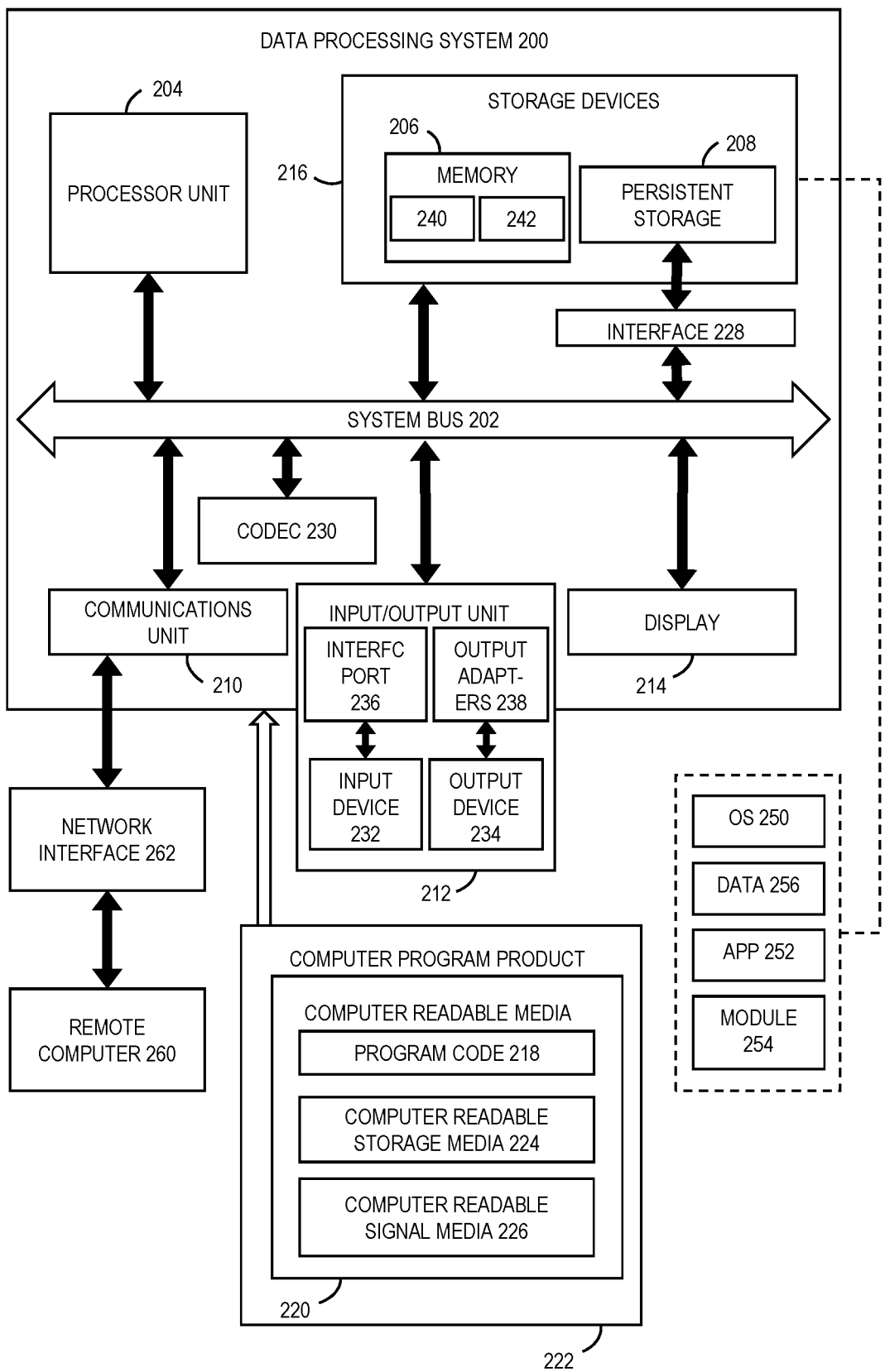
FIG. 3 is a schematic diagram of an illustrative data processing system.

As shown in FIG. 3, this example describes a data processing system 200 (also referred to as a computer, computing system, and/or computer system) in accordance with aspects of the present disclosure. In this example, data processing system 200 is an illustrative data processing system suitable for implementing aspects of the method of network mapping obfuscation. More specifically, in some examples, devices that are examples of data processing systems (e.g., smartphones, tablets, personal computers) may comprise systems of the network, may comprise the obfuscating module, and/or may connect to the network through the obfuscating module.

In this illustrative example, data processing system 200 includes a system bus 202 (also referred to as communications framework). System bus 202 may provide communications between a processor unit 204 (also referred to as a processor or processors), a memory 206, a persistent storage 208, a communications unit 210, an input/output (I/O) unit 212, a codec 230, and/or a display 214. Memory 206, persistent storage 208, communications unit 210, input/output (I/O) unit 212, display 214, and codec 230 are examples of resources that may be accessible by processor unit 204 via system bus 202.

Processor unit 204 serves to run instructions that may be loaded into memory 206. Processor unit 204 may comprise a number of processors, a multi-processor core, and/or a particular type of processor or processors (e.g., a central processing unit (CPU), graphics processing unit (GPU), etc.), depending on the particular implementation. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device may include any suitable hardware capable of storing information (e.g., digital information), such as data, program code in functional form, and/or other suitable information, either on a temporary basis or a permanent basis.

Storage devices 216 also may be referred to as computer-readable storage devices or computer-readable media. Memory 206 may include a volatile storage memory 240 and a non-volatile memory 242. In some examples, a basic input/output system (BIOS), containing the basic routines to transfer information between elements within the data processing system 200, such as during start-up, may be stored in non-volatile memory 242. Persistent storage 208 may take various forms, depending on the particular implementation.

Persistent storage 208 may contain one or more components or devices. For example, persistent storage 208 may include one or more devices such as a magnetic disk drive (also referred to as a hard disk drive or HDD), solid state disk (SSD), floppy disk drive, tape drive, Jaz drive, Zip drive, flash memory card, memory stick, and/or the like, or any combination of these. One or more of these devices may be removable and/or portable, e.g., a removable hard drive. Persistent storage 208 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 208 to system bus 202, a removable or non-removable interface is typically used, such as interface 228.

Input/output (I/O) unit 212 allows for input and output of data with other devices that may be connected to data processing system 200 (i.e., input devices and output devices). For example, input device 232 may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 204 through system bus 202 via interface port(s) 236. Interface port(s) 236 may include, for example, a serial port, a parallel port, a game port, and/or a universal serial bus (USB).

Output devices 234 may use some of the same types of ports, and in some cases the same actual ports, as input device(s) 232. For example, a USB port may be used to provide input to data processing system 200 and to output information from data processing system 200 to an output device 234. Output adapter 238 is provided to illustrate that there are some output devices 234 (e.g., monitors, speakers, and printers, among others) which require special adapters. Output adapters 238 may include, e.g. video and sounds cards that provide a means of connection between the output device 234 and system bus 202. Other devices and/or systems of devices may provide both input and output capabilities, such as remote computer(s) 260. Display 214 may include any suitable human-machine interface or other mechanism configured to display information to a user, e.g., a CRT, LED, or LCD monitor or screen, etc.

Communications unit 210 refers to any suitable hardware and/or software employed to provide for communications with other data processing systems or devices. While communication unit 210 is shown inside data processing system 200, it may in some examples be at least partially external to data processing system 200. Communications unit 210 may include internal and external technologies, e.g., modems (including regular telephone grade modems, cable modems, and DSL modems), ISDN adapters, and/or wired and wireless Ethernet cards, hubs, routers, etc. Data processing system 200 may operate in a networked environment, using logical connections to one or more remote computers 260. A remote computer(s) 260 may include a personal computer (PC), a server, a router, a network PC, a workstation, a microprocessor-based appliance, a peer device, a smart phone, a tablet, another network note, and/or the like. Remote computer(s) 260 typically include many of the elements described relative to data processing system 200. Remote computer(s) 260 may be logically connected to data processing system 200 through a network interface 262 which is connected to data processing system 200 via communications unit 210. Network interface 262 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 230 may include an encoder, a decoder, or both, comprising hardware, software, or a combination of hardware and software. Codec 230 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 230 is depicted as a separate component, codec 230 may be contained or implemented in memory, e.g., non-volatile memory 242.

Non-volatile memory 242 may include read only memory (ROM), programmable ROM (PROM), electrically programmable ROM (EPROM), electrically erasable programmable ROM (EEPROM), flash memory, and/or the like, or any combination of these. Volatile memory 240 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 216, which are in communication with processor unit 204 through system bus 202. In these illustrative examples, the instructions are in a functional form in persistent storage 208. These instructions may be loaded into memory 206 for execution by processor unit 204. Processes of one or more examples of the present disclosure may be performed by processor unit 204 using computer-implemented instructions, which may be located in a memory, such as memory 206.

These instructions are referred to as program instructions, program code, computer usable program code, or computer-readable program code executed by a processor in processor unit 204. The program code in the different examples may be embodied on different physical or computer-readable storage media, such as memory 206 or persistent storage 208. Program code 218 may be located in a functional form on computer-readable media 220 that is selectively removable and may be loaded onto or transferred to data processing system 200 for execution by processor unit 204. Program code 218 and computer-readable media 220 form computer program product 222 in these examples. In one example, computer-readable media 220 may comprise computer-readable storage media 224 or computer-readable signal media 226.

Computer-readable storage media 224 may include, for example, an optical or magnetic disk that is inserted or placed into a drive or other device that is part of persistent storage 208 for transfer onto a storage device, such as a hard drive, that is part of persistent storage 208. Computer-readable storage media 224 also may take the form of a persistent storage, such as a hard drive, a thumb drive, or a flash memory, that is connected to data processing system 200. In some instances, computer-readable storage media 224 may not be removable from data processing system 200.

In these examples, computer-readable storage media 224 is a non-transitory, physical or tangible storage device used to store program code 218 rather than a medium that propagates or transmits program code 218. Computer-readable storage media 224 is also referred to as a computer-readable tangible storage device or a computer-readable physical storage device. In other words, computer-readable storage media 224 is media that can be touched by a person.

Alternatively, program code 218 may be transferred to data processing system 200, e.g., remotely over a network, using computer-readable signal media 226. Computer-readable signal media 226 may be, for example, a propagated data signal containing program code 218. For example, computer-readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative examples, program code 218 may be downloaded over a network to persistent storage 208 from another device or data processing system through computer-readable signal media 226 for use within data processing system 200. For instance, program code stored in a computer-readable storage medium in a server data processing system may be downloaded over a network from the server to data processing system 200. The computer providing program code 218 may be a server computer, a client computer, or some other device capable of storing and transmitting program code 218.

In some examples, program code 218 may comprise an operating system (OS) 250. Operating system 250, which may be stored on persistent storage 208, controls and allocates resources of data processing system 200. One or more applications 252 take advantage of the operating system's management of resources via program modules 254, and program data 256 stored on storage devices 216. OS 250 may include any suitable software system configured to manage and expose hardware resources of computer 200 for sharing and use by applications 252. In some examples, OS 250 provides application programming interfaces (APIs) that facilitate connection of different type of hardware and/or provide applications 252 access to hardware and OS services. In some examples, certain applications 252 may provide further services for use by other applications 252, e.g., as is the case with so-called "middleware." Aspects of present disclosure may be implemented with respect to various operating systems or combinations of operating systems.

The different components illustrated for data processing system 200 are not meant to provide architectural limitations to the manner in which different examples may be implemented. One or more examples of the present disclosure may be implemented in a data processing system that includes fewer components or includes components in addition to and/or in place of those illustrated for computer 200. Other components shown in FIG. 3 can be varied from the examples depicted. Different examples may be implemented using any hardware device or system capable of running program code. As one example, data processing system 200 may include organic components integrated with inorganic components and/or may be comprised entirely of organic components (excluding a human being). For example, a storage device may be comprised of an organic semiconductor.

In some examples, processor unit 204 may take the form of a hardware unit having hardware circuits that are specifically manufactured or configured for a particular use, or to produce a particular outcome or progress. This type of hardware may perform operations without needing program code 218 to be loaded into a memory from a storage device to be configured to perform the operations. For example, processor unit 204 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 218) may be implemented as hardware, e.g., by specifying an FPGA configuration using a hardware description language (HDL) and then using a resulting binary file to (re)configure the FPGA.

In another example, data processing system 200 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, system bus 202 may comprise one or more buses, such as a system bus or an input/output bus. Of course, the bus system may be implemented using any suitable type of architecture that provides for a transfer of data between different components or devices attached to the bus system. System bus 202 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 210 may include a number of devices that transmit data, receive data, or both transmit and receive data. Communications unit 210 may be, for example, a modem or a network adapter, two network adapters, or some combination thereof. Further, a memory may be, for example, memory 206, or a cache, such as that found in an interface and memory controller hub that may be present in system bus 202.

The flowcharts and block diagrams described herein illustrate the architecture, functionality, and operation of possible implementations of systems, methods, and computer program products according to various illustrative examples. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

C. Illustrative Distributed Data Processing System

Figure 4:
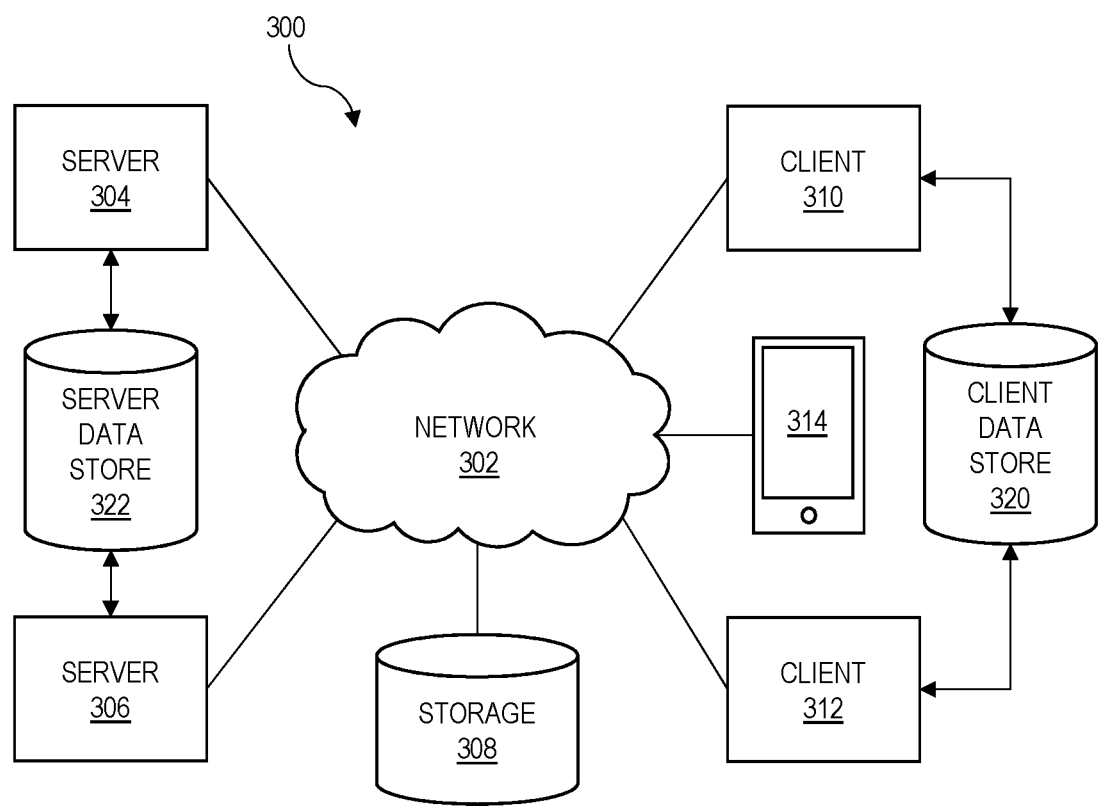
FIG. 4 is a schematic diagram of an illustrative distributed data processing system.

As shown in FIG. 4, this example describes a general network data processing system 300, interchangeably termed a computer network, a network system, a distributed data processing system, or a distributed network, the mapping of which may be protected by illustrative examples of an obfuscating module and/or method of obfuscation as disclosed herein. For example, a network module as described above may be operatively connected to the network, to act as a proxy for an access node such as a wireless router or an ethernet device.

It should be appreciated that FIG. 4 is provided as an illustration of one implementation and is not intended to imply any limitation with regard to environments in which different examples may be implemented. Many modifications to the depicted environment may be made.

Network system 300 is a network of devices (e.g., computers), each of which may be an example of data processing system 200, and other components. Network data processing system 300 may include network 302, which is a medium configured to provide communications links between various devices and computers connected within network data processing system 300. Network 302 may include connections such as wired or wireless communication links, fiber optic cables, and/or any other suitable medium for transmitting and/or communicating data between network devices, or any combination thereof.

In the depicted example, a first network device 304 and a second network device 306 connect to network 302, as do one or more computer-readable memories or storage devices 308. Network devices 304 and 306 are each examples of data processing system 200, described above. In the depicted example, devices 304 and 306 are shown as server computers, which are in communication with one or more server data store(s) 322 that may be employed to store information local to server computers 304 and 306, among others. However, network devices may include, without limitation, one or more personal computers, mobile computing devices such as personal digital assistants (PDAs), tablets, and smartphones, handheld gaming devices, wearable devices, tablet computers, routers, switches, voice gates, servers, electronic storage devices, imaging devices, media players, and/or other networked-enabled tools that may perform a mechanical or other function. These network devices may be interconnected through wired, wireless, optical, and other appropriate communication links.

In addition, client electronic devices 310 and 312 and/or a client smart device 314, may connect to network 302. Each of these devices is an example of data processing system 200, described above regarding FIG. 3. Client electronic devices 310, 312, and 314 may include, for example, one or more personal computers, network computers, and/or mobile computing devices such as personal digital assistants (PDAs), smart phones, handheld gaming devices, wearable devices, and/or tablet computers, and the like. In some examples, such client computers may include communications-enabled data processing systems on one or more vehicles, such as an aircraft, which are connected to network 302. In the depicted example, server 304 provides information, such as boot files, operating system images, and applications to one or more of client electronic devices 310, 312, and 314. Client electronic devices 310, 312, and 314 may be referred to as "clients" in the context of their relationship to a server such as server computer 304. Client devices may be in communication with one or more client data store(s) 320, which may be employed to store information local to the clients (e.g., cookie(s) and/or associated contextual information). Network data processing system 300 may include more or fewer servers and/or clients (or no servers or clients), as well as other devices not shown.

In some examples, first client electric device 310 may transfer an encoded file to server 304. Server 304 can store the file, decode the file, and/or transmit the file to second client electric device 312. In some examples, first client electric device 310 may transfer an uncompressed file to server 304 and server 304 may compress the file. In some examples, server 304 may encode text, audio, and/or video information, and transmit the information via network 302 to one or more clients.

Client smart device 314 may include any suitable portable electronic device capable of wireless communications and execution of software, such as a smartphone or a tablet. Generally speaking, the term "smartphone" may describe any suitable portable electronic device configured to perform functions of a computer, typically having a touchscreen interface, Internet access, and an operating system capable of running downloaded applications. In addition to making phone calls (e.g., over a cellular network), smartphones may be capable of sending and receiving emails, texts, and multimedia messages, accessing the Internet, and/or functioning as a web browser. Smart devices (e.g., smartphones) may also include features of other known electronic devices, such as a media player, personal digital assistant, digital camera, video camera, and/or global positioning system. Smart devices (e.g., smartphones) may be capable of connecting with other smart devices, computers, or electronic devices wirelessly, such as through near field communications (NFC), BLUETOOTH®, WiFi, or mobile broadband networks. Wireless connectively may be established among smart devices, smartphones, computers, and/or other devices to form a mobile network where information can be exchanged.

Data and program code located in system 300 may be stored in or on a computer-readable storage medium, such as network-connected storage device 308 and/or a persistent storage 208 of one of the network computers, as described above, and may be downloaded to a data processing system or other device for use. For example, program code may be stored on a computer-readable storage medium on server computer 304 and downloaded to client 310 over network 302, for use on client 310. In some examples, client data store 320 and server data store 322 reside on one or more storage devices 308 and/or 208.

Network data processing system 300 may be implemented as one or more of different types of networks. For example, system 300 may include an intranet, a local area network (LAN), a wide area network (WAN), or a personal area network (PAN). In some examples, network data processing system 300 includes the Internet, with network 302 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 302 may be referred to as a "cloud." In those examples, each server 304 may be referred to as a cloud computing node, and client electronic devices may be referred to as cloud consumers, or the like. FIG. 4 is intended as an example, and not as an architectural limitation for any illustrative examples.

D. Illustrative Aircraft Network System

Figure 5:
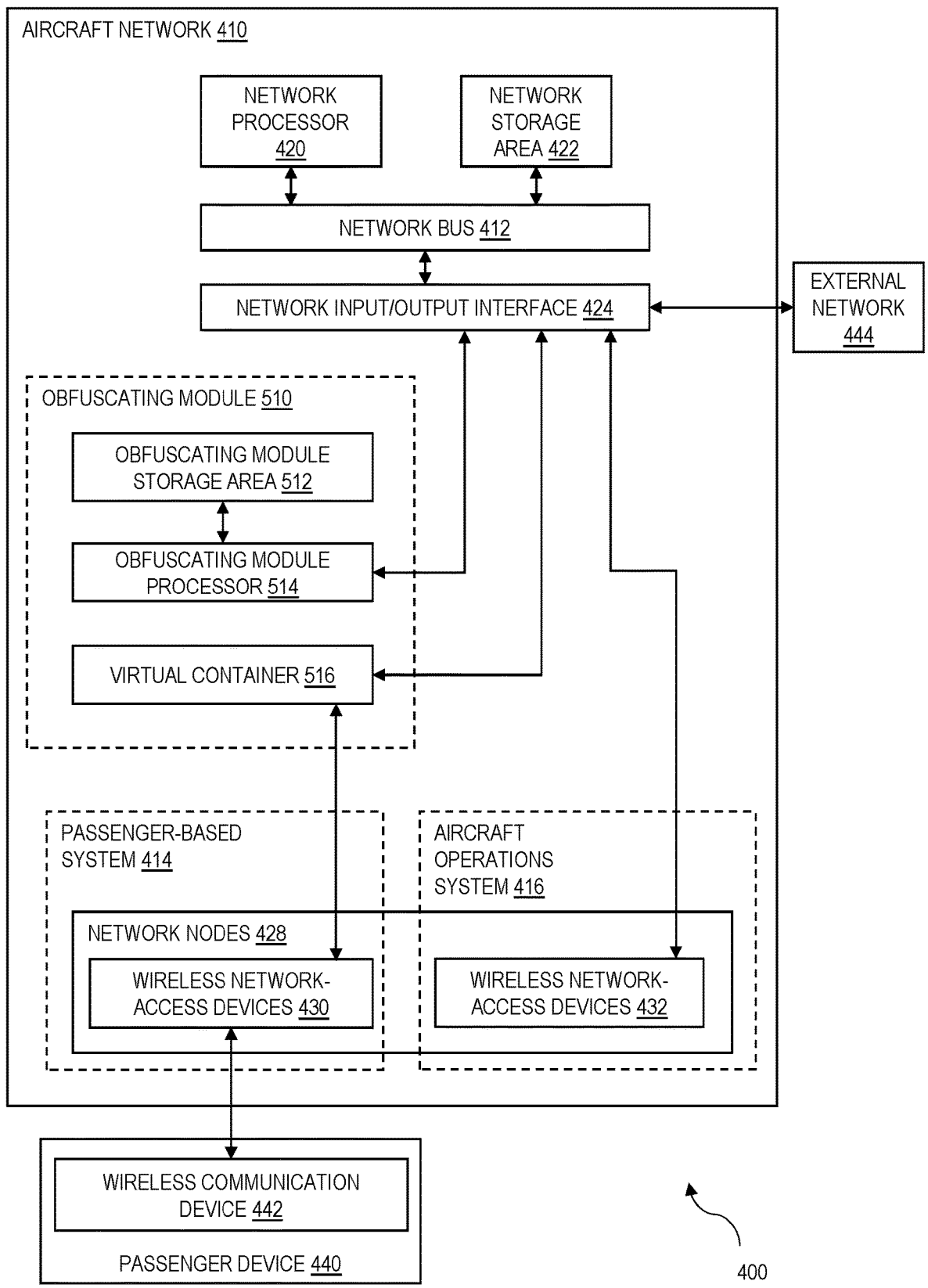
FIG. 5 is a schematic diagram of an illustrative aircraft network system, including an obfuscating module in accordance with aspects of the present disclosure.
Figure 6:
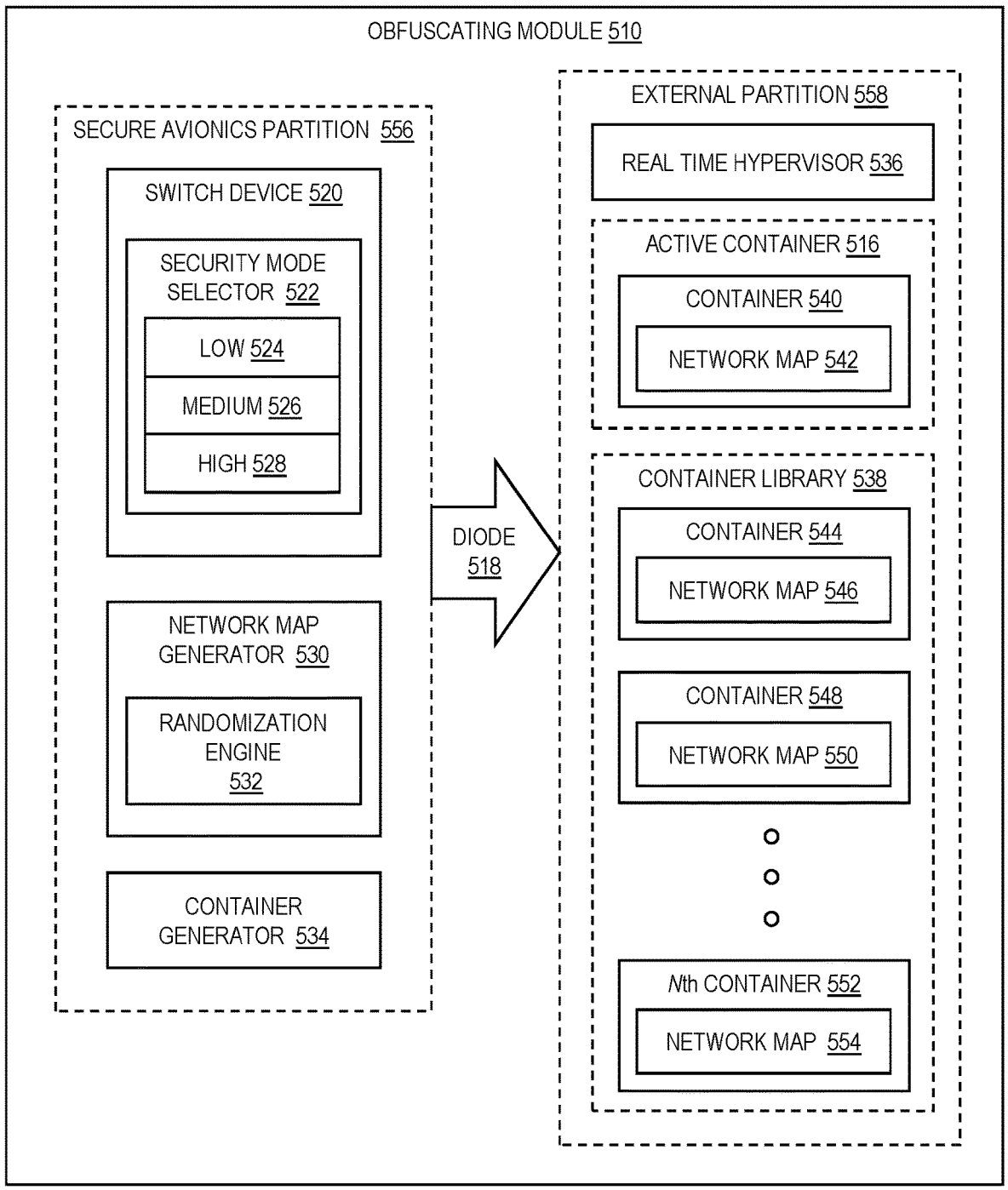
FIG. 6 is a schematic diagram of the obfuscating module of FIG. 5.
Figure 7:
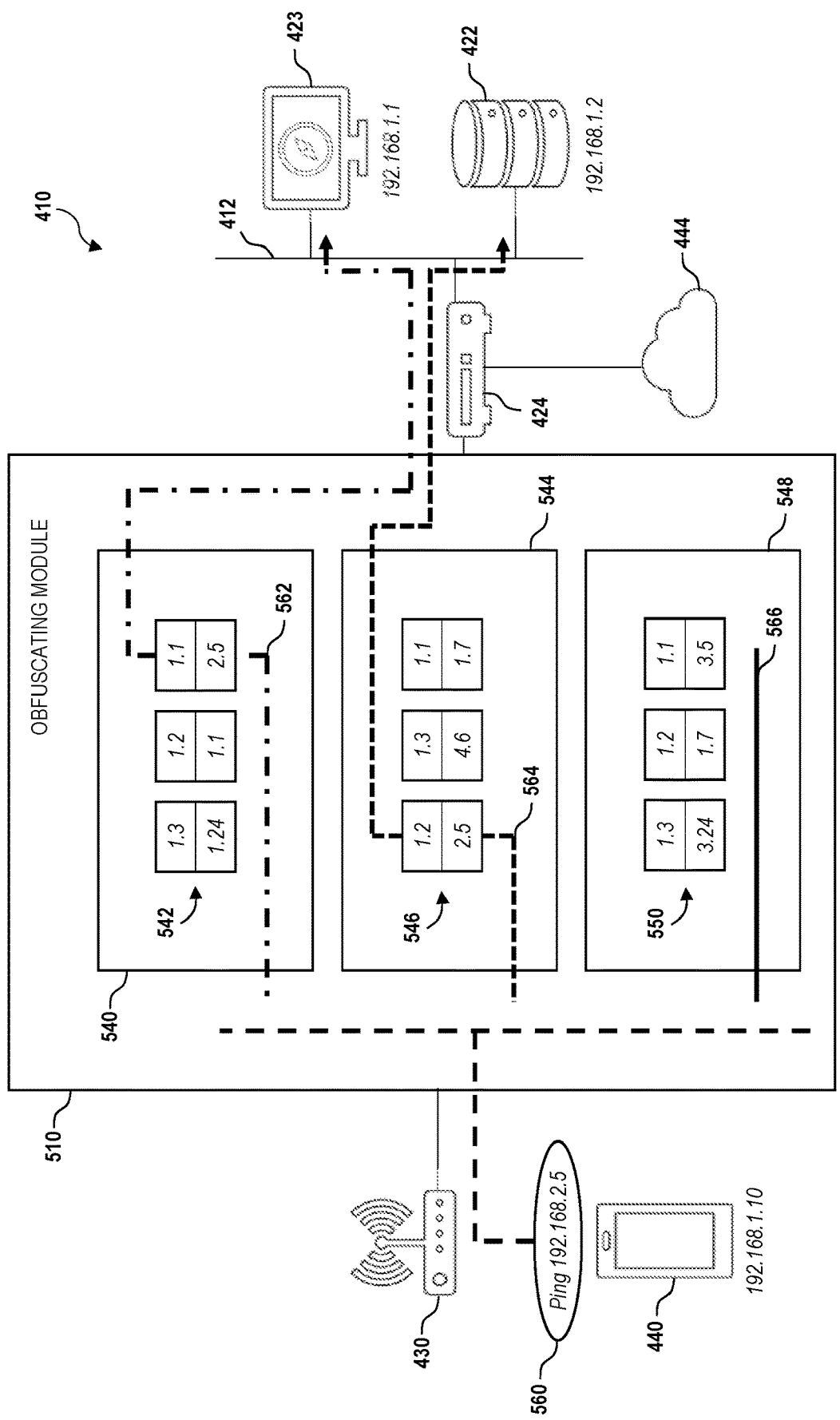
FIG. 7 is a schematic diagram illustrating operation of the obfuscating module of FIG. 5.

As shown in FIGS. 5-7, this section describes an illustrative network system 400. Network system 400 is an example of a network system such as network data processing system 300, which includes a network module for network mapping obfuscation as described above. Network system 400 can be included on aircraft 120 and/or any other suitable vehicle.

Network system 400 includes an aircraft network 410, as shown in FIG. 5. Aircraft network 410 comprises a medium configured to provide communication links between various devices within network system 400. Devices connected to aircraft network 410 can include one or more data processing systems that are examples of data processing system 200, described above. Aircraft network 410 can include connections such as wired or wireless communications links, fiber optic cables, and/or any other suitable medium for transmitting and/or communicating data between devices on the aircraft network.

Aircraft network 410 includes a network bus 412, which may also be referred to as a network communications framework and/or an avionics bus. Network bus 412 is connected to a network processor 420, a network input/output interface 424, and a network storage area 422 which includes at least a first storage device. Network bus 412 is configured to facilitate communications (e.g. data transmission) between network processor 420, input/output interface 424, storage area 422, and/or any other suitable network devices.

Network processor 420 includes one or more processors configured to execute instructions and may typically be an example of processor unit 204, described above. Network storage area 422 can include any suitable hardware or combination of hardware capable of storing information (e.g. digital information) such as data, program code in functional form, and/or other suitable information, either on a temporary basis or a permanent basis. The storage area can include a combination of one or more computer-readable storage devices including a computer-readable medium, volatile memory, non-volatile memory, a persistent storage device, and/or a non-persistent storage device.

Network input/output interface 424 is configured to facilitate input and output (e.g. reception and transmission) of data between network bus 412 and other devices connected to aircraft network 410. Network input/output interface 424 can include, for example, one or more switches, routers, hubs, gateways, repeaters, bridge routers, protocol converters, modulators, modems, and/or any other suitable hardware and/or software. The network input/output interface is connected (e.g. by wired and/or wireless communication links) to a plurality of network nodes 428, each configured to receive, create, store, and/or transmit data. The network nodes may also be described as network-access devices and can include wired and/or wireless access devices. Network nodes 428 are included in a passenger-based system 414 and an aircraft operations system 416.

Aircraft operations system 416 can include network devices and/or communication links that are reserved for use by systems and/or employees of the aircraft. For example, aircraft operations system 416 can be configured to operate HVAC devices, activate safety equipment (e.g., oxygen masks, fire suppression systems, and/or the like), to provide human-perceptible information to passengers (e.g., fire alarms, signals directing passengers to wear safety belts, and/or the like), and/or to perform any other function that is typically restricted to authorized vehicle personnel. Additionally, or alternatively, aircraft operations system 416 can include, or provide access to, systems associated with aircraft controls, such as primary controls, secondary controls, autopilot systems, envelope protection systems, thrust asymmetry compensation systems, and/or the like. Although illustrative aircraft operations system 416 is described here in connection with an aircraft (e.g., aircraft 120), network system 400 on any suitable type of vehicle can include a vehicle operations system similar to aircraft operations system 416 or other system applicable to the particular vehicle.

In the present example, aircraft operations system 416 includes a network access device 432 of network nodes 428. Network access device 432 of aircraft operations system 416 communicates directly with network input/output interface 424. Other network nodes 428 of the aircraft operations system may similarly communicate with the input/output interface. Network nodes of aircraft operations system 416 may be accessible only to authorized personnel and may be regarded as secure. Therefore, the network nodes of the aircraft operations system may communicate with network bus 412 through network input/output interface 424 without obfuscation as described below.

Passenger-based system 414 includes devices, media, and communication links intended for passenger use. Passenger-based system 414 can also include, for example, network nodes and/or devices configured to connect a passenger device 440 to an external network 444. Additionally, or alternatively, components of passenger-based system 414 can be configured to enable a passenger to use device 440 to access in-flight entertainment options (e.g., to stream or download movies or music stored within aircraft network 410), order food or drink, request assistance from aircraft cabin crew, obtain a status update on the aircraft (such as a location, speed, and/or estimated time of arrival), and/or the like.

In the present example, passenger-based system 414 includes a wireless network-access device 430 of network nodes 428. Wireless network-access device 430 can provide access to aircraft network 410 to passenger device 440. Passenger device 440 can be a smart phone, computer, laptop computer, tablet, and/or any other suitable electronic device capable of wireless communications. Passenger device 440 can be the personal property of a passenger, or can be any suitable electronic device operated by a passenger.

Passenger device 440 includes a wireless communication device 442 configured to facilitate communications with other data processing systems or devices. For example, wireless communication device 442 can be an example of communications unit 210 of data processing system 200, described above. Wireless communication device 442 can connect to aircraft network 410 through wireless network access device 430, thereby enabling passenger device 440 to communicate with the aircraft network. When wireless communication device 442 is connected to aircraft network 410, passenger device 440 may be referred to as being on the network, connected to the network, and/or networked.

Wireless network-access device 430 communicates with network input/output interface 424 through an obfuscating module 510. More specifically, all communication between wireless network-access device 430 and network input/output interface 424 is conducted through a virtual container 516 on the obfuscating module. Virtual container 516 is configured to act as a network input/output interface, and may be described as performing some or all functions of a router, gateway, and/or proxy server.

Obfuscating module 510 can take the form of a separate hardware module such as data processing system 200 described above, or a software module run on hardware of network input/output interface 424, or can combine software and hardware aspects in any effective manner. In the present example, obfuscating module 510 includes a dedicated storage area 512 and a dedicated processor 514. Processor 514 is in direct communication with network input/output interface 424, separate from virtual container 516. Virtual container 516 may be described as a virtual software environment executed by processor 514, using storage area 512. References herein to virtual container 516 and/or other virtual containers may be understood to encompass software and/or processes executed within the virtual software environment.

In some examples, aircraft network 410 can include multiple obfuscating modules to protect the network from users of multiple network-access devices. For instance, an obfuscating module can be operatively interposed between each network-access device of network nodes 428 of passenger-based system 414 and network input/output interface 424. In some examples, obfuscating module 510 can be operatively interposed between multiple network-access devices of network nodes 428 of passenger-based system 414 and network input/output interface 424. Any number of obfuscating modules may be used, as appropriate to the architecture of aircraft network 410. In some examples, multiple obfuscating modules can be connected in order to coordinate obfuscating functions.

Once passenger device 440 is connected to aircraft network 410, it can send and receive data communications over the network, but all such communications are routed through obfuscating module 510. In a typical example, a non-malicious passenger may connect to aircraft network 410 in order to obtain access to network storage area 422. For instance, the passenger may connect a smartphone to watch a movie.

In such an example, passenger device 440 sends a communication to wireless network-access device 430, requesting a network address for network storage area 422. The wireless network-access device forwards the request to obfuscating module 510, which in turn forwards the request to network input/output interface 424. The input/output interface provides the static network address assigned to network storage area 422, communicating the reply back to module 510.

Module 510 masks the provided static network address by communicating a substitute network address to passenger device 440, through wireless network access-device 430. Subsequently, packets sent by passenger device 440 to network storage area 422 are addressed to the substitute network address. When the packets are passed by wireless network access-device 430 to module 510, the module edits each packet address to the static network address assigned to network storage area 422. The packets are then passed to network input/output interface 424 and on to storage area 422.

Obfuscating module 510 may be described as performing basic or one-to-one Network Address Translation (NAT) between the network address space or map of aircraft network 410 and a generated artificial network map. That is, the obfuscating module edits intercepted packets to replace static addresses of aircraft network 410 with substitute addresses from the generated artificial network map, and vice versa. In some examples, obfuscating module 510 can additionally or alternatively edit other packet information such as port numbers.

In addition to masking the static network mapping of aircraft network 410, obfuscating module 510 is configured to change the generated artificial network map that is used for NAT. As shown in FIG. 6, obfuscating module 510 includes a plurality of virtual containers, each having an associated network map. To change the generated artificial map, the obfuscating module changes which virtual container is active.

Referring again to FIG. 5 and continuing the above example, the substitute network address for network storage area 422 provided by obfuscating module 510 to passenger device 440 is taken from a first network map. After the change to network map 546, packets sent from passenger device 440 are no longer effectively addressed for delivery to network storage area 422. The passenger may experience a brief loss of connectivity while passenger device 440 again requests a network address for network storage area 422 and receives a new substitute network address for the network storage area, from a second network map.

Obfuscating module 510 can thereby obfuscate the network mapping of aircraft network 410 from passenger device 440. Changes of the network map used by module 510 may cause minimal disruption of communication between passenger device 440 and approved network devices. That is, authorized activity of passenger device 440 on aircraft network 410 may typically comprise system-to-system communications which include protocols for automatic re-establishing of communication after a change in network address. Such communications may experience minimal disruption. However, reconnaissance of the network mapping for unauthorized activity may be disrupted by the network map change, as discussed further below in reference to FIG. 7.

FIG. 6 is a schematic depiction of an illustrative example of obfuscating module 510. The storage area of the module is divided into two partitions, a secure avionics partition 556 and an external partition 558. Data flow between avionics partition 556 and external partition 558 is restricted to unidirectional flow, from the avionics partition to the external partition. In the present example, data flow is restricted by a software data diode 518. In some examples, partitions 556 and 558 can comprise separate storage devices and/or data processing systems and data flow can be restricted by a hardware data diode.

External partition 558 includes a virtualization system configured to manage a plurality of separate virtual environments and allocate hardware and/or software resources such as memory or operating system (OS) services among the virtual environments. In the present example, the virtualization system is a real time hypervisor 536, which manages a plurality of containers. In some examples, the virtualization system can include a container manager, the virtual environments can include virtual machines, and/or any effective virtualization may be used.

Hypervisor 536 maintains an active container 516 and a container library 538. As depicted in FIG. 6, the active container is currently a container 540. Active container 516 is in communication with wireless network access device 430 and network input/output interface 424, and acts as a proxy server or gateway as described above.

Container library 538 includes at least one inactive container. The inactive containers are not in communication with or connected to aircraft network 410. In the depicted example, the library has N inactive containers including a container 544, a container 548, and a container 552. N can be any integer number, but the number of inactive containers included in library 538 may be limited to reduce processing and memory demand associated with managing the library.

Hypervisor 536 can rotate the containers, selecting a next container of container library 538 to become the active container. For example, the hypervisor may select container 544 as a next active container. Container 540 may be disconnected from aircraft network 410, temporarily severing communication between wireless network-access device 430 and network input/output interface 424. Container 540 can be shut down, or can be returned to container library 538 as an inactive container. Container 544 is then connected to aircraft network 410, to again facilitate communication between wireless network-access device 430 and network input/output interface 424. Container 544 then becomes active container 516. Hypervisor 536 rotates the containers when a rotation instruction is received from secure avionics partition 556.

Each container includes a different network map. In the present example, container 540 includes a network map 542, container 544 includes a network map 546, container 548 includes a network map 550, and container 552 includes a network map 554. Obfuscating module 510 performs basic NAT between the network map of aircraft network 410 and the network map of the active container. For example, while container 540 is active, obfuscating module performs NAT according to network map 542.

Obfuscating module 510 is configured to generate new containers and network maps as the containers are rotated by hypervisor 536. Secure avionics partition 556 includes a network map generator 530 and a container generator 534. Network map generator 530 includes a randomization engine 532, to facilitate generation of randomized network maps. A generated network map can include Internet Protocol (IP) addresses, ports, network asset identifiers, and/or any other information used in network communication.

In some examples, generating a network map can include associating a randomly selected network address with every network address currently assigned to a network device or connected data processing system on aircraft network 410. Associating a randomly selected network address only with network addresses currently in use may reduce processing and memory requirements associated with generating and storing each network map but may require communication between secure avionics partition 556 and network input/output interface 424.

In some examples, generating a network map can include associating a randomly selected network address to every network address valid for the communication protocol used by aircraft network. Such complete maps may require additional processing and memory to generate and store but may allow secure avionics partition 556 to operate without connection to network input/output interface 424.

The network maps can be randomized within the constraints of the communication protocol used by aircraft network 410, and/or can be randomized within constraints selectable by an administrator of aircraft network 410. For example, a network address of aircraft network 410 can be associated with a network address randomly selected from any of the IP addresses reserved for use as private IP addresses. For another example, a network administrator can restrict the randomly selected address to the block of private IP addresses between 192.168.0.0 and 192.168.255.255.

Each generated network map is stored in a corresponding generated container. Each container and stored network map are then passed to external partition 558, to be added to container library 538.

Secure avionics partition 556 further includes a switch device 520, which is configured to initiate rotation of the containers in external partition 558. Switch device 520 can transmit rotation requests to hypervisor 536 according to one or more pre-selected criteria. The criteria can be selected by an administrator of aircraft network 410 and/or of obfuscating module 510. Typically, the criteria may include that the aircraft on which network 410 operates is in flight, in addition to any desired additional criteria.

For example, switch device 520 can receive geographical location data from a navigation system included in aircraft operations system 416, regarding the location of the aircraft. When the aircraft is assigned to a specific flight path or commercial route, the administrator can select one or more geographical locations. Subsequently, when the aircraft reaches the selected geographical locations switch device 520 can transmit a rotation request to hypervisor 536.

For another example, switch device 520 can communicate with a database in aircraft operations system 416 which includes passenger data. Switch device 520 can receive alerts from the database when a passenger on a flight has previously traveled or aboard the same plane, has a flagged travel status, and/or any criteria selected by the administrator. Switch device 520 can then transmit a rotation request once during a flight when no alerts have been received for the flight but can transmit a rotation request every half hour when at least one alert has been received.

For another example, switch device 520 can communicate with network input/output interface 424 regarding network activity. When specific network activities occur or surpass selected thresholds, switch device 520 can transmit a rotation request. For instance, a rotation can be initiated if an intrusion into a restricted system is detected, or activity on the network by a passenger device exceeds typical levels.

Switch 520 can also be configured to allow dynamic triggering of a container rotation by hypervisor 536. For example, the switch can be configured to receive a rotation request over network 410 from a computer used by the aircraft pilot and/or receive a rotation request from a local interface of obfuscating module 510 physically accessible to authorized personnel such as cabin crew.

In the present example, switch device 520 includes a security mode selector 522. The security mode selector includes a user interface configured to simplify selection of criteria for rotation. A user can select between security settings of low 524, medium 526, and high 528. Each mode selects a corresponding set of criteria for switch device 520. For example, each security setting can specify a time-interval based criteria. Low security setting 524 may select a two-hour interval between rotations. Medium security setting 526 may select a one-hour interval between rotations. High security setting 528 may select rotation at random intervals, each interval being no more than thirty minutes.

Selection of lower security settings when security concerns are limited may be advantageous due to the resulting reduction in processing loads. Effects of additional processing requirements such as increased heat generation and power demand may be particularly undesirable on an aircraft.

Security mode selector 522 can facilitate use of obfuscating module 510 by a user with limited knowledge or expertise regarding network security. For example, security mode selector 522 may allow air crew to update criteria selection for obfuscating module 510 prior to each flight. An administrator of aircraft network 410, technical support personnel for an airline operating the aircraft, manufacturer of obfuscating module 510, or other qualified individual or organization can update the definitions of the modes selectable using security mode selector 522. For example, when a new network reconnaissance technique enters into popular use, a software update may be released for the obfuscating module which decreases the time between container rotations in each mode.

Security mode selector can also include a sleep or standby mode. In such a mode, obfuscating module 510 can relay packets between network input/output interface 424 and wireless network-access device 430 without editing. Such a mode may facilitate maintenance of aircraft network 410 by technical personnel. For example, troubleshooting of a malfunctioning wireless network-access device or installation of new nodes in passenger-based system 414 may be significantly simpler on a static network. In some examples, such a standby mode may be utilized whenever a plane is not in flight. However, for aircraft in highly secure areas continued operation of obfuscating module 510 may be appropriate.

Secure avionics partition 556 is configured to be inaccessible to passenger device 440. The secure avionics partition communicates only with network input/output interface 424 of aircraft network 410, and not with other network nodes or passenger devices. In some examples, secure avionics partition 556 may not be connected to aircraft network 410 and administrative functions for obfuscating module 510 may need to be performed locally.

Obfuscating module 510 can also be configured to ensure the inaccessibility of secure avionics partition 556 to passenger device 440. Such configuration can include hardware and/or software features. For example, secure avionics partition 556 can run on a dedicated processor and storage device, separate from external partition 558.

FIG. 7 is a schematic diagram illustrating obfuscation of the mapping of aircraft network 410 by module 510 under reconnaissance by an attacker. In the present example, the attacker is a passenger of the aircraft using passenger device 440. An attacker may include any actor on or off of the aircraft, with access to a network-access device such as wireless network-access device 430. Typically, reconnaissance includes locating network assets by sending queries to a series of valid network addresses until a response is received. A common query may include a ping or other echo request packet. In the present example, passenger device 440 sends a ping 560 to local network address 192.168.2.5.

Ping 560 is sent from passenger device 440 to wireless network-access device 430, and forwarded to obfuscating module 510. The subsequent path of ping 560 is dependent on which container of obfuscating module 510 is currently active. If container 540 is active, ping 560 will follow the path indicated by dash-dot line 562. Container 540 receives ping 560 and edits the ping packet address according to network map 542. As indicated in FIG. 7, network map 542 associates address 192.168.2.5 with actual address 192.168.1.1 of aircraft network 410. The edited ping is forwarded to network input/output interface 424, which delivers the edited ping to 192.168.1.1. That address is assigned to an avionics system 423 connected to network bus 412, so passenger device 440 will receive a reply indicating the presence of a restricted-access system at the address 192.168.2.5.

If container 544 is active, ping 560 will follow the path indicated by dashed line 564. Container 544 receives ping 560 and edits the ping packet address according to network map 546. As indicated in FIG. 7, network map 546 associates address 192.168.2.5 with actual address 192.168.1.2 of aircraft network 410. The edited ping is forward to network input/output interface 424, which delivers the edited ping to 192.168.1.2. That address is assigned to network storage area 422, so passenger device 440 will receive a reply indicating the presence of an accessible network device at the address 192.168.2.5.

If container 548 is active, ping 560 will follow the path indicated by solid line 566. Container 548 receives ping 560 and edits the ping packet address according to network map 550. As indicated in FIG. 7, network map 550 does not associate address 192.168.2.5 with any address currently in use on aircraft network 410. The ping will not be delivered, and passenger device 440 will return a time-out message indicating no network asset at the address 192.168.2.5.

Consider an example in which ping 560 is sent while container 540 is active. The attacker records the presence of a restricted-access system at the address 192.168.2.5 and continues pinging other valid addresses to locate additional network assets. While reconnaissance proceeds, obfuscating module 510 rotates containers as described above, such that container 548 becomes active. When the attacker attempts to communicate with 192.168.2.5 again, the network will indicate no device at that address.

To proceed with further intrusions into restricted systems of aircraft network 410, the attacker must therefore repeat the reconnaissance phase. Ideally, the attacker may remain in the reconnaissance phase for the duration of the flight and be rendered unable to perform attacks on or intrusions into any systems of aircraft network 410.

Additionally, depending on the reconnaissance technique utilized, obfuscating module 510 can remain undetected on the network. Obfuscating module 510 and the containers can be configured to reduce the likelihood of discovery. For example, the obfuscating module can be configured to edit packets intercepted between wireless network-access device 430 and network input/output interface 424, to mask or anonymize a static network address assigned to the obfuscating module.

E. Illustrative Method

Figure 8:
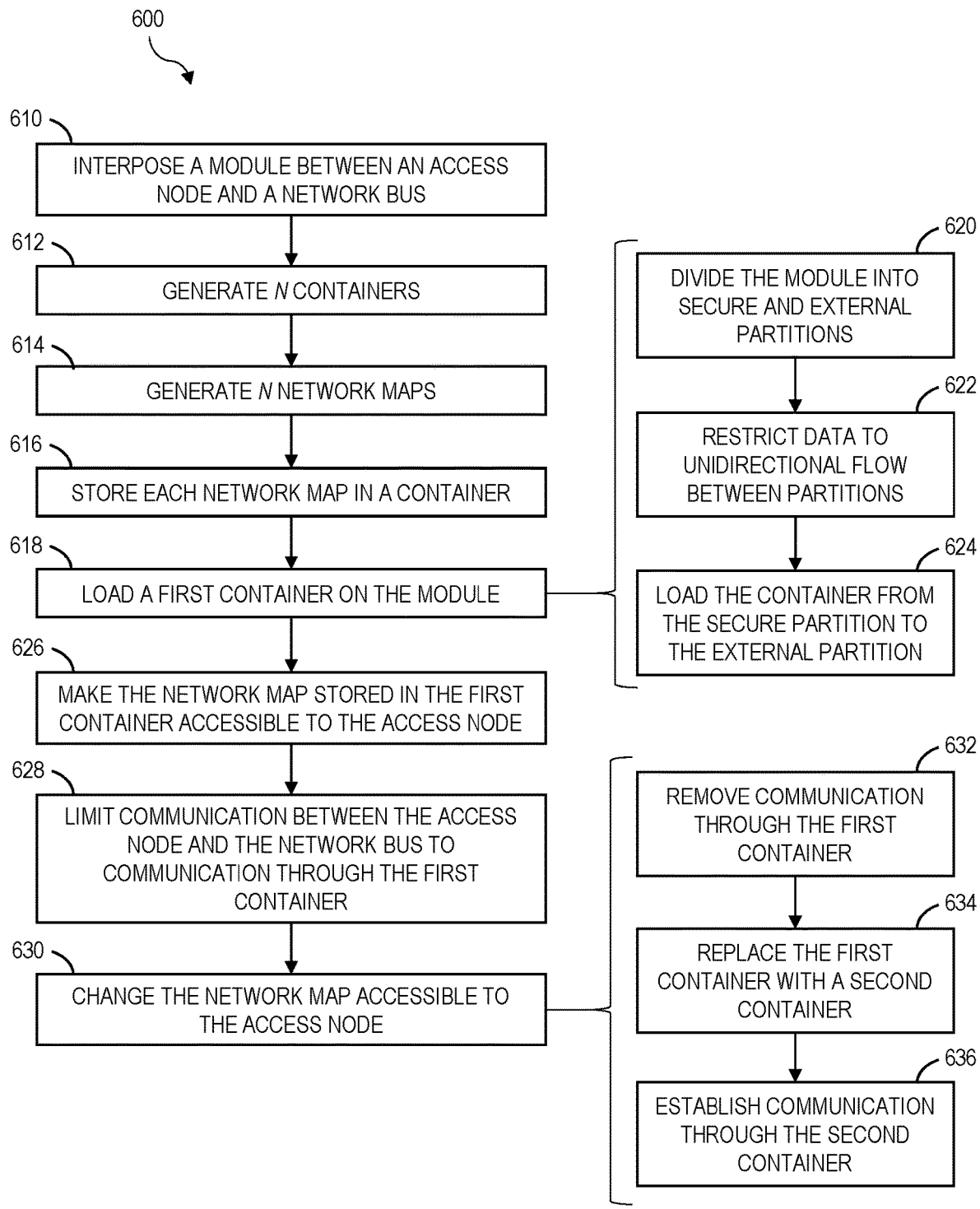
FIG. 8 is a flow chart depicting steps of an illustrative method of obfuscating mapping of a computer network according to the present teachings.

This section describes steps of an illustrative method for obfuscating mapping of an avionic network; see FIG. 8. Aspects of aircraft networks and/or network modules described above may be utilized in the method steps described below. Where appropriate, reference may be made to components and systems that may be used in carrying out each step. These references are for illustration, and are not intended to limit the possible ways of carrying out any particular step of the method.

FIG. 8 is a flowchart illustrating steps performed in an illustrative method, and may not recite the complete process or all steps of the method. Although various steps of method 600 are described below and depicted in FIG. 8, the steps need not necessarily all be performed, and in some cases may be performed simultaneously or in a different order than the order shown.

At step 610, the method includes interposing a module between an access node and a network bus. In some examples, the module may be interposed between an access node and another type of network communication system and/or all other nodes of a network having any network topology. The module may be a distinct hardware module such as data processing system 200 described above, or a software module run on hardware of a network interface such as a gateway, or can combine software and hardware aspects in any effective manner. The module may include and/or run on a processor and a computer readable storage device.

The module may be operatively connected to the access node and the network bus. The module may communicate directly with the access node and/or the network bus, and/or may communicate through a network interface such as a gateway, router, or proxy. The module may be connected to the access node, the network bus, and/or a network interface by any suitable communications link, including but not limited to wireless communications links, optical fiber cable, or coaxial cable.

Step 612 of the method includes generating N containers, where N is any positive integer. Each container may comprise an operating system level virtualization, configured to allow an isolated virtualized system to run on the module. Generating the container may include storing, configuring, and/or initializing software or processes within the container. In some examples, the step may include generating other virtual environments such as virtual machines by methods such as full virtualization and/or hardware-assisted virtualization.

Step 614 of the method includes generating N network maps, where N is any positive integer. Each map may comprise a plurality of pairs of associated network addresses. Each map may be randomly generated, and associate a random network address with each of a set of network addresses, where the set of network addresses may include each static address assigned on a network including the network bus and/or may include every network address valid in the communication protocol or protocols in operation on the network. Each map may additionally or alternatively include other network communication data such as port numbers or physical addresses.

At step 616, the method includes storing each network map in a container. Storing a network map in a container may include storing data associated with the network map in a storage device or area allocated to a container and/or such that the data is accessible to software and/or processes running in the container.

Steps 612 through 616 may be performed simultaneously and/or may be performed repeatedly in sequence. For example, containers and network maps may be generated concurrently. For another example, a first container may be generated, a first network map may be generated, and the first network map may be stored in the first container. Then a second network map may be generated, and the second network map may be stored in the second container. Steps 612 through 616 may be repeated as throughout method 600, as additional containers and network maps are needed.

Step 618 includes loading a first container on the module. Sub-step 620 of step 618 includes dividing the module into a secure partition and an external partition. The division may be in hardware and/or software. For example, the partitions may be formed by disk partitioning of a single storage device and may share a processor. For another example, each partition may comprise a separate storage device and processor Sub-step 622 of step 618 includes restricting data flow to a unidirectional flow between partitions. Data may be restricted to flow from the secure partition to the external partition. Restriction may be performed with a data diode, including software or hardware diodes. Sub-steps 620 and 622 may be performed prior to step 610, as part of a setup process for the module. Steps 612 through 616 may then be performed on the secure partition.

Sub-step 624 includes loading the first container from the secure partition to the external partition. Loading the container may include transmitting and/or communicating data associated with the first container from the secure partition to the external partition, through a data diode. Loading the container may also include initiating the container, and/or assumption of control of the container by a hypervisor, container manager, and/or other virtualization system. In some examples, loading the container may include storing the container in a library of inactive containers.

At step 626, method 600 includes making the network map stored in the first container accessible to the access node. Making the network map accessible may include selecting the first container from a library of inactive containers, and designating the first container as an active container. Making the network map accessible may further include establishing communication between the first container and the access node. For example, server software running in the container may be placed in communication with the access node. The first container may communicate with the access node according to the network map.

Step 628 includes limiting communication between the access node and the network bus to communication through the first container. Limiting communication may include configuring architecture of the network such that the access node is connected solely to the module. Limiting communication may further include configuring the module such that the access node communicates solely with a selected virtual container on the external partition of the module.

The first container may be configured to act as a network interface such as a gateway, router, or proxy server. Such configuration may include initialization of software and/or processes within the container, such as a server operating system or a virtual router. The first container may facilitate communication between the access node and the network bus and may communicate with the access node according the network map stored in the first container.

Step 630 of the method includes changing the network map accessible to the access node. Sub-step 632 of step 630 includes removing communication through the first container. Removing communication may include disconnecting the first container and/or software or processes running in the container from the access node and the network bus. Removing communication may further include shutting down or terminating the software or processes running in the container.

Sub-step 634 of step 630 includes replacing the first container with a second container. The second container may be one of the N containers generated in steps 612-616, and may be loaded on the module according to step 618. The second container may be selected from the library of inactive containers and designated as the active container. The first container may be shut down.

Sub-step 636 of step 630 includes establishing communication through the second container. Similarly to steps 626 and 628, the sub-step may include making the network map stored in the second container accessible to the access node and limiting communication between the access node and the network bus to communication through the second container. Software and/or processes similar to or matching those in the first container may be run in the second container to facilitate communication between the access node and the network bus, according to the network map stored in the second container.

Illustrative Combinations and Additional Examples

This section describes additional aspects and features of methods and apparatus for obfuscating mapping of a computer network, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A method of obfuscating mapping of an avionic network, comprising:

operatively coupling a network module between an external-access node and an avionics bus of the avionic network with all communications between the external-access node and the avionics bus passing through the network module;

generating a first network map identifying network addresses for a first set of components on at least a first portion of the avionics bus;

loading the first network map on the network module;

making the first network map on the network module accessible to the external-access node;

generating at least a second network map identifying network addresses for a second set of components on at least a second portion of the avionic network, the second network map being different from the first network map, loading the second network map on the network module; and changing the network map accessible to the external-access node from the first network map to the second network map.

A1. The method of A0, further comprising:

generating at least first and second virtual environments;

storing the first network map in the first virtual environment; and storing the second network map in the second virtual environment; and wherein loading the first network map on the network module includes loading the first virtual environment storing the first network map on the network module, and loading the second network map on the network module includes loading the second virtual environment storing the second network map on the network module.

A2. The method of A1, further comprising limiting communication between the avionics bus and the external-access node to communication through the first virtual environment.

A3. The method of A2, wherein changing the network map accessible to the external-access node from the first network map to the second network map includes removing communication of the external-access node with the first virtual environment, and establishing communication of the external-access node with the second virtual environment.

A4. The method of A2 or A3, wherein changing the network map accessible to the external-access node from the first network map to the second network map includes replacing on the network module the first virtual environment storing the first network map with the second virtual environment storing the second network map.

A5. The method of any of A1-A4, wherein each of the first and second virtual environments is a container.

A6. The method of any of A1-A5, wherein each of the first and second virtual environments is a virtual machine.

A7. The method of any of A1-A6, wherein loading the first virtual environment storing the first network map on the network module includes loading the first virtual environment from an avionics partition of the network module onto an external partition on the network module, and the method further comprises restricting data flow between the avionics partition and the external partition of the module to unidirectional data flow from the avionics partition to the external partition.

A8. The method of A7, wherein restricting data flow between the avionics partition and the external partition of the module to unidirectional data flow includes transmitting data from the avionics partition to the external partition through a data diode.

A9. The method of any of A1-A8, further including generating a plurality of N virtual environments including the first virtual environment and the second virtual environment, where N is an integer greater than 2.

A10. The method of A9, further comprising:
rotating which virtual environment of the plurality of virtual environments is accessible to the external-access node.

A11. The method of any of A0-A10, wherein changing the network map accessible to the external-access node includes changing the network map accessible to the external-access node in response to meeting at least a first predetermined criterion.

A12. The method of A11, wherein the at least a first predetermined criterion for changing the network map accessible to the external-access node includes a fixed basis for changing the network map accessible to the external-access node.

A13. The method of A12, wherein the fixed basis is a set time period.

A14. The method of A12 or A13, wherein the fixed basis is a predetermined sequence of a set of network maps including the first and second network maps.

A15. The method of any of A12-A14, wherein the fixed basis is a predetermined geographical location of an aircraft.

A16. The method of any of A11-A15, wherein the at least a first predetermined criterion for changing the network map accessible to the external-access node includes a randomized basis for changing the network maps accessible to the external-access node.

A17. The method of A16, wherein the randomized basis includes a varying time period.

A18. The method of any of A11-A17, wherein the at least a first predetermined criterion for changing the network map accessible to the external-access node is based at least in part on a relative level of security of the avionic network.

B0. A network module for obfuscating mapping of an avionic network, wherein the network module is operatively coupled to the avionic network and configured to:
be operatively interposed between an avionics bus of the avionic network and an external-access node with all communications between the external-access node and the avionics bus passing through the network module;
generate a first network map identifying network addresses for a first set of components on at least a first portion of the avionic network;
make the first network map on the network module accessible to the external-access node;
generate a second network map identifying network addresses for a second set of components on at least a second portion of the avionic network, the second network map being different from the first network map; and
change the network map accessible to the external-access node from the first network map to the second network map.

B1. The network module of B0, wherein the network module is configured to:
generate at least first and second virtual environments;
store the first network map in the first virtual environment;
make the first virtual environment accessible to the external-access node;
store the second network map in the second virtual environment; and
change the virtual environment accessible to the external-access node from the first virtual environment to the second virtual environment.

B2. The network module of B1, comprising a first partition and a second partition, wherein:
the first partition is operatively coupled to the avionic network and configured to generate the at least first and second virtual environments, to load the first virtual environment storing the first network map onto the second partition, and to not conduct communication between the avionics bus and the external-access node; and
the second partition is configured to be operatively interposed between the avionics bus and the external node.

B3. The network module of B2, wherein the second partition is configured to remove communication of the external-access node with the first virtual environment, and establish communication of the external-access node with the second virtual environment.

B4. The network module of B2 or B3, wherein the first partition is configured to replace on the second partition the first virtual environment storing the first network map with the second virtual environment storing the second network map.

B5. The network module of any of B1-B4, wherein each of the first and second virtual environments is a container.

B6. The network module of B5, wherein the network module is configured to rotate the container that is accessible to the external-access node.

B7. The network module of any of B1-B6, wherein each of the first and second virtual environments is a virtual machine.

B8. The network module of any of B0-B7, wherein the network module is configured to change the network map accessible to the external-access node in response to meeting at least a first predetermined criterion.

B9. The network module of B8, wherein the at least a first predetermined criterion for changing the network map accessible to the external-access node includes a fixed basis for changing the network map accessible to the external-access node.

B10. The network module of B9, wherein the fixed basis is a set time period.

B11. The network module of B9 or B10, wherein the fixed basis is a predetermined sequence of a set of network maps including the first and second network maps.

B12. The network module of any of B9-B11, wherein the fixed basis is a predetermined geographical location of an aircraft having the avionic network.

B13. The network module of any of B8-B12, wherein the at least a first predetermined criterion for changing the network map accessible to the external-access node includes a randomized basis for changing the network maps accessible to the external-access node.

B14. The network module of B13, wherein the randomized basis includes a varying time period.

B15. The network module of any of B8-B14, wherein the at least a first predetermined criterion for changing the network map accessible to the external-access node is based at least in part on a relative level of security of the avionic network.

B16. The network module of any of B1-B15, comprising a first partition and a second partition, wherein the first partition is operatively coupled to the avionic network and configured to load the first virtual environment storing the first network map from the first partition onto the second partition, the second partition is configured to be operatively interposed between the avionics bus and the external node, and the network module is configured to restrict data flow between the first partition and the second partition to unidirectional data flow from the first partition to the second partition.

B17. The network module of B16, further comprising a data diode restricting data flow between the first partition and the second partition to unidirectional data flow from the first partition to the second partition.

C0. A system for obfuscating network mapping of an avionic network of an aircraft, comprising:
  a first container including a first network map identifying network addresses for network components of at least a first portion of the avionic network;
  a second container including a second network map identifying network addresses for network components of at least a second portion of the avionic network, the second network map being different from the first network map; and
  a switching device configured to interpose the first container between an avionics bus of the avionic network and an external-access node, and in response to at least a first criterion, replacing the first container with the second container interposed between the avionics bus and the external-access node for changing the network map accessible to the external-access node from the first network map to the second network map.

C1. The system of C0, wherein the at least a first criterion includes a fixed basis for changing the network map accessible to the external-access node from the first network map to the second network map.

C2. The system of C0 or C1, wherein the at least a first criterion includes a randomized basis for changing the network map accessible to the external-access node from the first network map to the second network map.

C3. The system of any of C0-C2, further comprising:
  an secure partition including the switching device;
  an external partition accessible to the external-access node; and
  a data diode providing unidirectional data flow from the secure partition to the external partition.

C4. The system of any of C0-C3, wherein the switching device has a first mode of operating and a second mode of operating different than the first mode, the first and second modes being configured to provide different levels of security.

C5. The system of any of C0-C4, wherein the system includes a container manager operating on a host machine and running the first and second containers.

C6. The system of C5, wherein the host machine has a secure partition including the switching device and an external partition including the container manager.

C7. The system of C6, wherein only unidirectional data flow is allowed between the secure partition and the external partition, with the unidirectional data flow being from the secure partition to the external partition.

C8. The system of C7, further comprising a data diode providing the unidirectional data flow.

C9. The system of any of C0-C8, wherein the system is configured as a network gateway.

C10. The system of any of C0-C9, wherein the system is a proxy server.

C11. The system of any of C0-C10, wherein each container is configured as a network gateway.

C12. The system of any of C0-C11, further comprising a randomization engine configured to generate the first and second network maps.

D0. An intermediate network gateway for obfuscating network mapping of an avionic network, comprising:
  an external partition configured to be operatively positioned in the avionic network between an external network access point and an avionics bus, the external partition including;
    multiple containers each including an associated different network map; and
    a container manager running the multiple containers; and
  a secure partition in data communication with the external partition, the secure partition including a switching device configured to select an active container from the multiple containers, wherein the active container acts as a proxy server between the external network access point and the avionics bus, and provides the associated network map to the external network access point.

D1. The intermediate network gateway of D0, wherein the switching device selects the active container from among the multiple containers on a rotating basis.

D2. The intermediate network gateway of D0 or D1, wherein the secure partition further includes a randomization engine operatively coupled to the switching device that generates the different network maps on a random basis.

D3. The intermediate network gateway of D2, wherein the secure partition further includes a container generator operatively coupled to the randomization engine and configured to generate the multiple containers.

Advantages, Features, and Benefits

The different examples of the method and apparatus described herein provide several advantages over known solutions for protecting a computer network against cyber-attack. For example, illustrative examples described herein forestall an attack in the reconnaissance phase, before unauthorized intrusion occurs.

Additionally, and among other benefits, illustrative examples described herein allow attacks to be forestalled without alerting the attacker to the presence of an obfuscating module.

Additionally, and among other benefits, illustrative examples described herein allow selection of a security level based on multiple preset and dynamic variables.

Additionally, and among other benefits, illustrative examples described herein protect the obfuscating module from direct attack.

No known system or device can perform these functions, particularly with such limited processing demands. Thus, the illustrative examples described herein are particularly useful for networks on vehicles such as aircraft. However, not all examples described herein provide the same advantages or the same degree of advantage.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of obfuscating mapping of an avionic network, comprising:
   operatively coupling a network module between an external-access node and an avionics bus of the avionic network with all communications between the external-access node and the avionics bus passing through the network module;
   generating, by means of a randomization engine, a first network map identifying one-to-one network address translations for a set of components on at least a portion of the avionics bus;
   loading the first network map on the network module;
   making the first network map on the network module accessible to the external-access node;
   generating, by means of a randomization engine, at least a second network map identifying one-to-one network address translations for the set of components, the second network map being different from the first network map,
   loading the second network map on the network module;
   disrupting any reconnaissance of the avionic network by changing the network map accessible to the external-access node from the first network map to the second network map;
   wherein disrupting reconnaissance maintains authorization of an external device to access the network through the external-access node; and
   wherein any scanned network map of the avionics network from an external-access node is rendered ineffective once the accessible network map changes.

2. The method of claim 1, further comprising:
   generating at least first and second virtual environments;
   storing the first network map in the first virtual environment; and
   storing the second network map in the second virtual environment; and
   wherein loading the first network map on the network module includes loading the first virtual environment storing the first network map on the network module, and loading the second network map on the network module includes loading the second virtual environment storing the second network map on the network module.

3. The method of claim 2, further comprising limiting communication between the avionics bus and the external-access node to communication through the first virtual environment.

4. The method of claim 3, wherein changing the network map accessible to the external-access node from the first network map to the second network map includes removing communication of the external-access node with the first virtual environment, and establishing communication of the external-access node with the second virtual environment.

5. The method of claim 1, wherein changing the network map accessible to the external-access node includes changing the network map accessible to the external-access node in response to meeting at least a first predetermined criterion.

6. The method of claim 5, wherein the at least a first predetermined criterion for changing the network map accessible to the external-access node includes a fixed basis for changing the network map accessible to the external-access node.

7. The method of claim 6, wherein the fixed basis is a predetermined geographical location of an aircraft.

8. The method of claim 5, wherein the at least a first predetermined criterion for changing the network map accessible to the external-access node includes a randomized basis for changing the network maps accessible to the external-access node.

9. The method of claim 8, wherein the randomized basis includes a varying time period.

10. A network module for obfuscating mapping of an avionic network, wherein the network module is operatively coupled to the avionic network and configured to:
    be operatively interposed between an avionics bus of the avionic network and an external-access node with all communications between the external-access node and the avionics bus passing through the network module;
    generate a first one-to-one network map identifying substitute local network IP addresses for a set of components on at least a portion of the avionic network;
    make the first network map on the network module accessible to the external-access node;
    generate a second one-to-one network map identifying substitute local network IP addresses for the set of components, the second network map being different from the first network map; and
    obfuscate network locations of the set of components by changing the network map accessible to the external-access node from the first network map to the second network map;
    wherein the obfuscation maintains authorization of an external device to access the network through the external-access node; and
    wherein any scanned network map of the avionics network from an external-access node is rendered ineffective once the accessible network map changes.

11. The network module of claim 10, wherein the network module is configured to:
    generate at least first and second virtual environments;
    store the first network map in the first virtual environment;
    make the first virtual environment accessible to the external-access node;
    store the second network map in the second virtual environment; and
    change the virtual environment accessible to the external-access node from the first virtual environment to the second virtual environment.

12. The network module of claim 11, comprising a first partition and a second partition, wherein:
    the first partition is operatively coupled to the avionic network and configured to generate the at least first and second virtual environments, to load the first virtual environment storing the first network map onto the second partition, and to not conduct communication between the avionics bus and the external-access node; and
    the second partition is configured to be operatively interposed between the avionics bus and the external node.

13. The network module of claim 11, comprising a first partition and a second partition, wherein the first partition is operatively coupled to the avionic network and configured to load the first virtual environment storing the first network map from the first partition onto the second partition, the second partition is configured to be operatively interposed between the avionics bus and the external node, and the network module is configured to restrict data flow between the first partition and the second partition to unidirectional data flow from the first partition to the second partition.

14. The network module of claim 13, further comprising a data diode restricting data flow between the first partition and the second partition to unidirectional data flow from the first partition to the second partition.

15. The network module of claim 10 wherein:
each of the first and second network maps are hosted in a virtual container;
each of the containers are software packages comprised of an application, configurations, and dependencies;
each of the containers form isolated user space instances; and
the isolated user space instances are unable to access a host operating system.

16. A system for obfuscating network mapping of an avionic network of an aircraft, comprising:
a first container including a first network map identifying network addresses for network components of at least a first portion of the avionic network;
a second container including a second network map identifying network addresses for network components of at least a second portion of the avionic network, the second network map being different from the first network map;
a switching device configured to interpose the first container between an avionics bus of the avionic network and an external-access node, and in response to at least a first criterion, replacing the first container with the second container interposed between the avionics bus and the external-access node for changing the network map accessible to the external-access node from the first network map to the second network map;
wherein:
each of the first and second containers are software packages comprised of an application, configurations, and dependencies;
each of the first and second containers form isolated user space instances; and
the isolated user space instances are unable to access a host operating system.

17. The system of claim 16, wherein the switching device has a first mode of operating and a second mode of operating different than the first mode, the first and second modes being configured to provide different levels of security.

18. The system of claim 16, wherein:
the system includes a container manager operating on a host machine and running the first and second containers; and
each container is configured as a network gateway.

19. The system of claim 18, wherein the host machine has a secure partition including the switching device and an external partition including the container manager.

20. The system of claim 16, further comprising a randomization engine configured to generate the first and second network maps.

* * * * *